(12) United States Patent
O'Connell et al.

(10) Patent No.: US 7,996,714 B2
(45) Date of Patent: Aug. 9, 2011

(54) SYSTEMS AND METHODS FOR REDUNDANCY MANAGEMENT IN FAULT TOLERANT COMPUTING

(75) Inventors: Brendan O'Connell, Huntsville, AL (US); Joseph Kochocki, Lynnfield, MA (US)

(73) Assignee: Charles Stark Draper Laboratory, Inc., Cambridge, MA (US)

( * ) Notice: Subject to any disclaimer, the term of this patent is extended or adjusted under 35 U.S.C. 154(b) by 514 days.

(21) Appl. No.: 12/082,974

(22) Filed: Apr. 14, 2008

(65) Prior Publication Data

US 2009/0259885 A1    Oct. 15, 2009

(51) Int. Cl.
G06F 11/00    (2006.01)

(52) U.S. Cl. .................. 714/12; 718/108; 714/11

(58) Field of Classification Search .......... None
See application file for complete search history.

(56) References Cited

U.S. PATENT DOCUMENTS

| | | | |
|---|---|---|---|
| 4,979,191 A | 12/1990 | Bond et al. | |
| 5,193,175 A * | 3/1993 | Cutts et al. | 714/11 |
| 5,233,615 A * | 8/1993 | Goetz | 714/12 |
| 5,349,654 A | 9/1994 | Bond et al. | |
| 5,377,206 A | 12/1994 | Smith | |
| 5,881,074 A * | 3/1999 | Rao | 714/786 |
| 6,047,391 A | 4/2000 | Younis et al. | |
| 6,581,089 B1 * | 6/2003 | Imamura | 718/107 |
| 6,687,851 B1 * | 2/2004 | Somers et al. | 714/12 |
| 7,103,745 B2 | 9/2006 | Koning et al. | |
| 2003/0120963 A1 * | 6/2003 | Jahnke | 713/322 |

OTHER PUBLICATIONS

Keichafer, et al., "The MAFT Architecture for Distributed Fault Tolerance," IEEE Transactions on Computers, vol. 37, No. 4, pp. 398-404, Apr. 1988.

Morgan, "Integrated Modular Avionics for Next Generation Commercial Airplanes," IEEE Aerospace and Electronic Systems Magazine, vol. 6, No. 8, pp. 9-12, Aug. 1991.

Audsley, et al., "Distributed fault-tolerant avionic systems—a realtime perspective," Proc. Aerospace Conference, IEEE, pp. 43-60, 1998.

Rushby, "Partitioning in Avionics Architectures: Requirements, Mechanisms, and Assurance," NASA/CR-1999-209347, National Technical Information Service (NTIS), Springfield, Virginia, Final Report, Mar. 2000.

Ventura et al., "Generic Avionics Scaleable Computing Architecture," Proc. Data Systems in Aerospace (DASIA), 1999.

Lee, et al., "Scheduling Tool and Algorithm for Integrated Modular Avionics Systems," Proc. 19th Digital Avionics Systems Conference (DASC), IEEE, pp. 1C2/1-1C2/8, 2000.

Redling, "Integrated Flight Control Systems—A New Paradigm For An Old Art," Proc. 19th Digital Avionics Systems Conferences (DASC), IEEE, pp. 1C4/1-1C4/8, 2000.

Kim, "Strongly Partitioned System Architecture for Integration of Real-Time Applications," PhD dissertation, Computer Science, University of Florida, 2001.

(Continued)

Primary Examiner — Gabriel L Chu
(74) Attorney, Agent, or Firm — Ropes & Gray LLP

(57) ABSTRACT

Systems and methods for redundancy management in fault tolerant computing are provided. The systems and methods generally relate to enabling the use of non-custom, off-the-shelf components and tools to provide redundant fault tolerant computing. The various embodiments described herein, generally speaking, use a decrementer register in a general purpose processor for synchronizing identical operations across redundant general purpose processors, execute redundancy management services in the kernels of commercial off-the-shelf real-time operating systems (RTOS) running on the general purpose processors, and use soft coded tables to schedule operations and assign redundancy management parameters across the general purpose processors.

26 Claims, 14 Drawing Sheets

OTHER PUBLICATIONS

Younis et al., "Integrating Redundancy Management and Real-time Services for Ultra Reliable Control Systems," Honeywell International Inc., Columbia, Maryland, 2001.

"BAE Systems CsLEOS Chosen For Advanced Flight Control on U.S. Air Force C-17 Transport," Press Release 020/2003, BAE Systems, Jan. 2003.

Adams, "A380 Innovations: A Balancing Act," Avionics Magazine, Mar. 2003.

Jensen, "FBW for the S-92," Avionics Magazine, Mar. 2004.

"Electronic architectures for UAVs: Getting it together," Smiths Aerospace, 2004.

Agrawal et al., "An Open Software Architecture for High-integrity and High-availability Avionics," Proc. 23rd Digital Avionics Systems Conference (DASC), IEEE, pp. 8C2/1-8C2/11 2004.

Adams, "COTS Operating Systems: Boarding the Boeing 787," Avionics Magazine, Apr. 2005.

Black et al., "Next Generation Space Avionics: Layered System Implementation," IEEE Aerospace and Electronic Systems Magazine, vol. 20, No. 12, pp. 9-14, Dec. 2005.

Ferguson et al., "System Software Framework for System of Systems Avionics," Proc. 24th Digital Avionics Systems Conference (DASC), IEEE, pp. 8A1/1-8A1/10, 2005.

Obermaisser et al., "A Fault Hypothesis for Integrated Architectures," Proc. International Workshop on Intelligent Solutions in Embedded Systems (WISES), IEEE, pp. 1-18, 2006.

O'Connell, "Achieving fault tolerance via robust partitioning and N-Modular Redundancy", Master of Science Thesis, Dept. of Aeronautics and Astronautics, Mass. Inst. of Tech., Cambridge, Mass., 2007. (Published Jul. 6, 2009).

\* cited by examiner

500

```
1   <PortGroups>
2       <RMPortGroup
3           Name="various_inputs"
4           ExchangeType="TwoRound"
5           <Ports>
6               <PortNameRef ="input_type_1_CH1" SrcCh="CH1"/>
7               <PortNameRef ="input_type_2_CH1" SrcCh="CH1"/>
8               <PortNameRef ="input_type_1_CH2" SrcCh="CH2"/>
9               <PortNameRef ="input_type_2_CH2" SrcCh="CH2"/>
10              <PortNameRef ="input_type_1_CH3" SrcCh="CH3"/>
11              <PortNameRef ="input_type_2_CH3" SrcCh="CH3"/>
12          </Ports>
13      </RMPortGroup>
14
15      <RMPortGroup
16          Name="various_outputs"
17          ExchangeType="OneRound"
18          <Ports>
19              <PortNameRef="output_type_1" SrcCh="ALL"/>
20              <PortNameRef="output_type_2" SrcCh="ALL"/>
21              <PortNameRef="output_type_3" SrcCh="ALL"/>
22          </Ports>
23      </RMPortGroup>
```

SYSTEMS AND METHODS FOR REDUNDANCY MANAGEMENT IN FAULT TOLERANT COMPUTING

BACKGROUND OF THE INVENTION

This invention relates generally to computer systems, and more particularly, to systems and methods for redundant fault tolerant computing by allowing the use of non-custom, off-the-shelf components and tools.

With the recent technological breakthroughs in areas such as aviation/space travel, advanced robotics, and online trading/payment systems, the demand for reliable computing platforms is stronger than ever. Redundant computers executing the same operations using the same inputs can provide fault tolerance by comparing the outputs from all the computers and isolating the computer that generates an error.

A typical redundant fault tolerant computing system includes custom hardware that adds to the cost and difficulty of design, production, modification and upgrade, leading to a high cost of system ownership. For cost-sensitive industries such as banking and securities trading, the high cost of ownership of these systems can put a company at a competitive disadvantage. In addition, custom hardware adds to the size and weight of the system, putting severe constraints on applications such as aviation/space travel, where space and load capacities are at a premium.

SUMMARY OF THE INVENTION

In accordance with various embodiments of the present invention, systems and methods for improved redundant fault tolerant computing systems by allowing the use of non-custom, off-the-shelf components and tools are provided. Various embodiments described herein, generally speaking, use a decrementer register in a general purpose processor for synchronizing identical operations across redundant general purpose processors, execute redundancy management (RM) services in the kernel of a commercial off-the-shelf real-time operating system (RTOS) running on each general purpose processor, and use soft coded tables to schedule operations and assign RM parameters across the general purpose processors. These features improve upon current redundant fault tolerant computing systems by making them easier and less expensive to design, produce, modify and upgrade, resulting in more cost effective, smaller and lighter systems.

For purposes of clarity, and not by way of limitation, the systems and methods can sometimes be described herein in the context of fault tolerant computing based on three redundant general purpose processors. However, it can be understood that the systems and methods of the present invention can be applied to any other suitable type and number of devices.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which:

FIG. 5 shows an illustrative table including configurable RM parameters;

DETAILED DESCRIPTION OF THE PRESENT INVENTION

Figure 1:
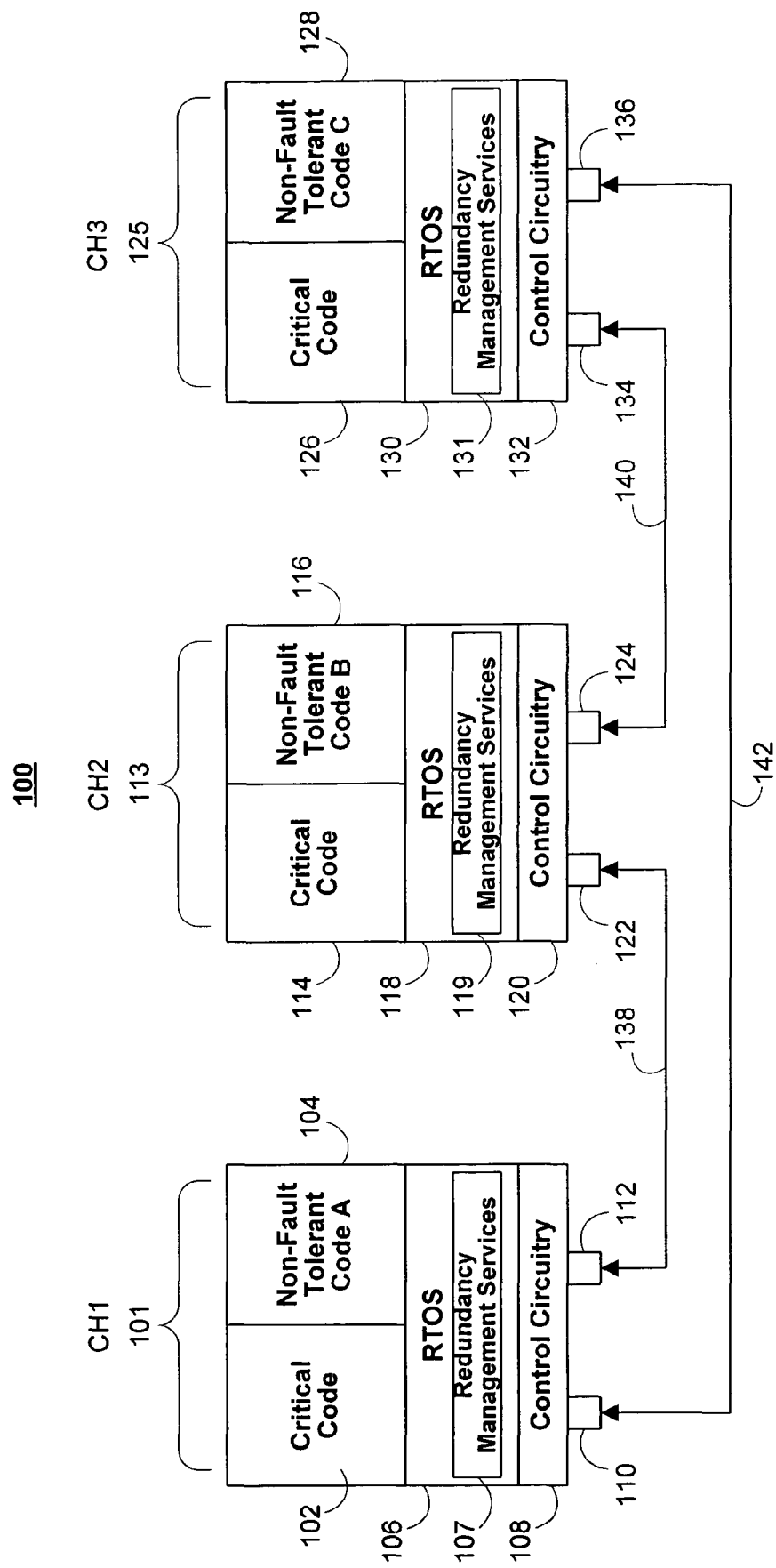
FIG. 1 is a schematic diagram of a system that can be used to provide redundant fault tolerant computing in accordance with one embodiment of the invention.

FIG. 1 shows an illustrative schematic diagram that shows a system that can be used to provide redundant fault tolerant computing in accordance with one embodiment. In particular, system 100 includes redundant computer systems 101 (computer channel CH1), 113 (computer channel CH2) and 125 (computer channel CH3).

Each of computer systems 101, 113 and 125 can have control circuitry (108, 120 and 132, respectively). Control circuitry can include processing circuitry and storage (not shown). Control circuitry can be used to dedicate space on, and direct recording of information to, storage devices, and direct output to output devices (e.g., audio output, display, etc.). Control circuitry can send and receive input/output, commands, requests and other suitable data. Control circuitry can be based on any suitable processing circuitry such as processing circuitry based on one or more microprocessors, microcontrollers, digital signal processors, programmable logic devices, etc. For example, control circuitry can be based on commercial off-the-shelf, general purpose processors, such as the PowerPC 750GX. POWERPC is a trademark of IBM. In some embodiments, control circuitry executes instructions for an application stored in memory. Memory (e.g., random-access memory, read-only memory, cache memory, flash memory or any other suitable memory), hard drives, optical drives or any other suitable fixed or removable storage devices can be provided as storage that is part of control circuitry. Moreover, storage can include one or more of the above types of storage devices.

Processing circuitry in each of control circuitry 108, 120 and 132 can execute a suitable operating system, such as a real-time operating system (106, 118, 130). The operating system, for example, can be a commercial off-the-shelf real-time operating system, such as VxWorks 653. VXWORKS is a trademark of Wind River Systems. The operating system in embodiments involved in aviation/space travel can be, for example, a RTOS that complies with the ARINC 653 standard (titled "Avionics Application Software Standard Interface") developed by the Airlines Electronic Engineering Committee (AEEC) of Aeronautical Radio Inc. VxWorks 653 is one example of an ARINC-compliant RTOS.

The RM services 107, 119 and 131 can be user defined code that performs fault tolerance and RM functions. It can be written in any suitable programming language, such as C, C++, Java, or Ada. It can share the same memory region as the kernel of the real-time operating system. Critical code 102, 114 and 126 can be code that uses the services provided by RM services 107, 119 and 131. For example, critical code 102, 114 and 126 can be flight critical code that reads sensor inputs in a space shuttle. They can be written in any suitable programming language, such as C, C++, Java, or Ada. They may use memory regions that are protected, for example in computer channel CH1 101, by the real-time operating system 106 and the control circuitry 108. The memory region for each application may be different than the memory region used by the RM services in the kernel of the real-time operating system. Processing circuitry in control circuitry 108, 120 and 132 execute identical operations (based on RM services 107, 119 and 131 and critical code 102, 114 and 126 respectively) in a synchronized manner to provide fault tolerance through redundancy. RM services are discussed in detail below in connection with FIG. 4. Processing circuitry in control circuitry 108, 120 and 132 can respectively execute non-fault tolerant code 104, 116 and 128, which can be user defined code that is specific to each computer channel.

Communications circuitry 110, 112, 122, 124, 134 and 136 can be used for communications among computer channels CH 101, CH2 113, and CH3 125 (e.g., to synchronize identical operations across general purpose processors on computer channels CH1 101, CH2 113, and CH3 125). Communications circuitry 110, 112, 122, 124, 134 and 136 can be used for communication with wired or wireless devices. Communications circuitry 110, 112, 122, 124, 134 and 136 can include any suitable wired or wireless modem/transceiver for communications with other equipment. Such communications can involve any suitable communications networks or paths. While communications paths 138, 140 and 142 are shown connecting computer channels CH 101, CH2 113, and CH3 125 to each other, these devices can communicate with each other directly or indirectly via any suitable wired or wireless paths, such as commercial off-the-shelf equipment. In one embodiment, commercial off-the-shelf hardware is configured to provide point-to-point, full duplex, Gigabit Ethernet (e.g., using soft coded tables, described below in connection with FIGS. 4-5).

Figure 2A:
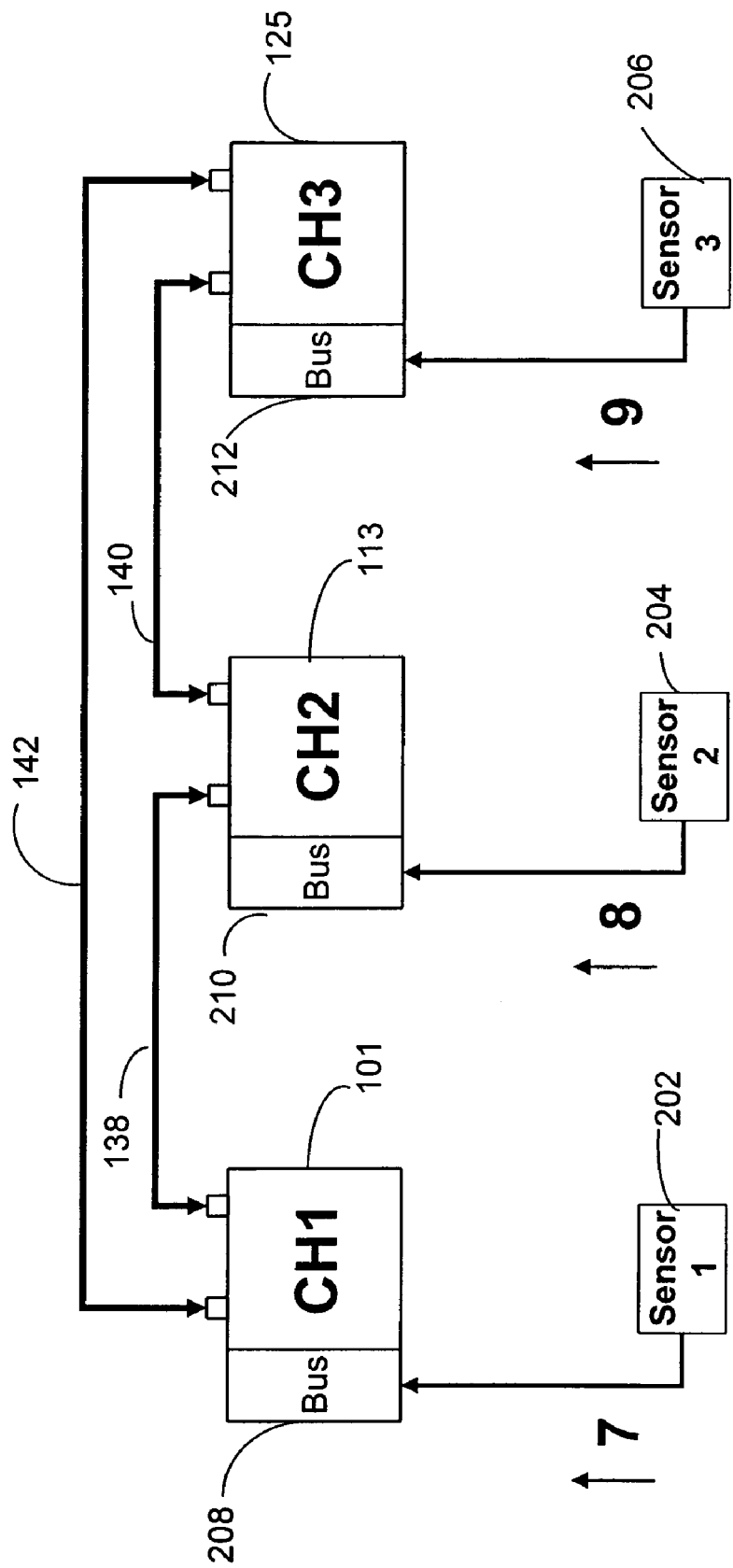
FIGS. 2A-C are schematic diagrams depicting a process for reliably exchanging input values in a redundant fault tolerant computer system in accordance with one embodiment of the invention.
Figure 2B:
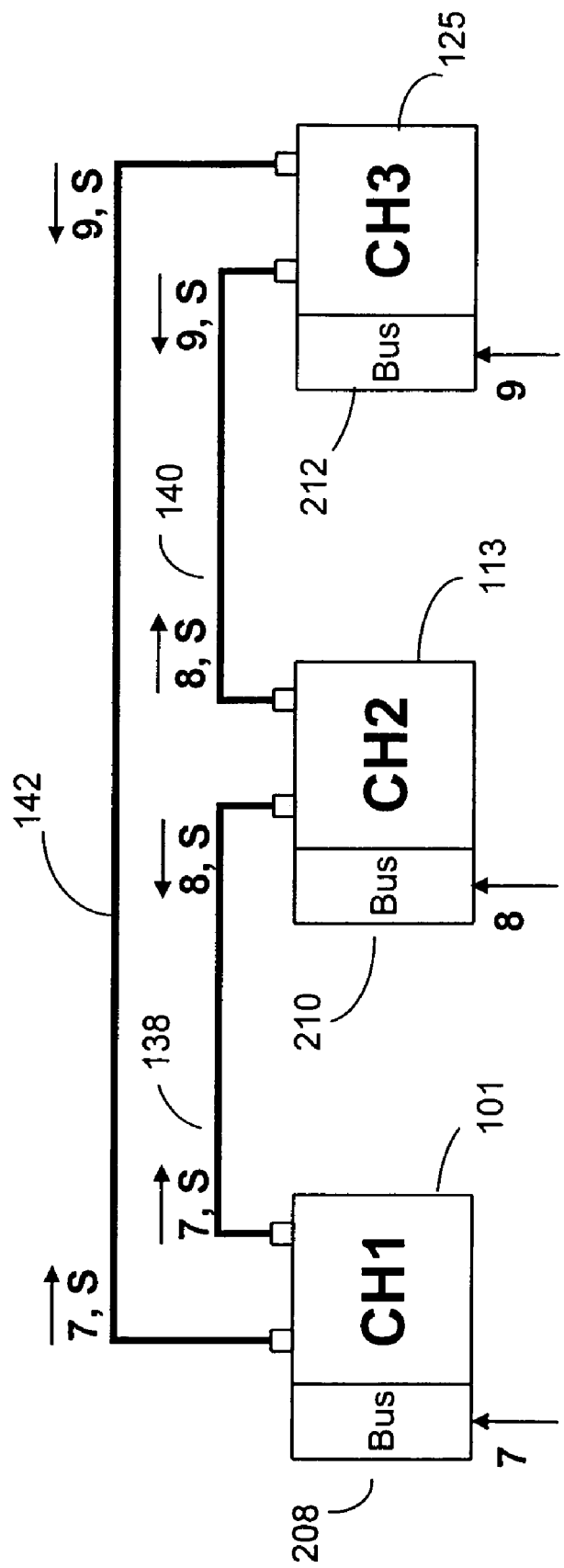
Figure 2C:
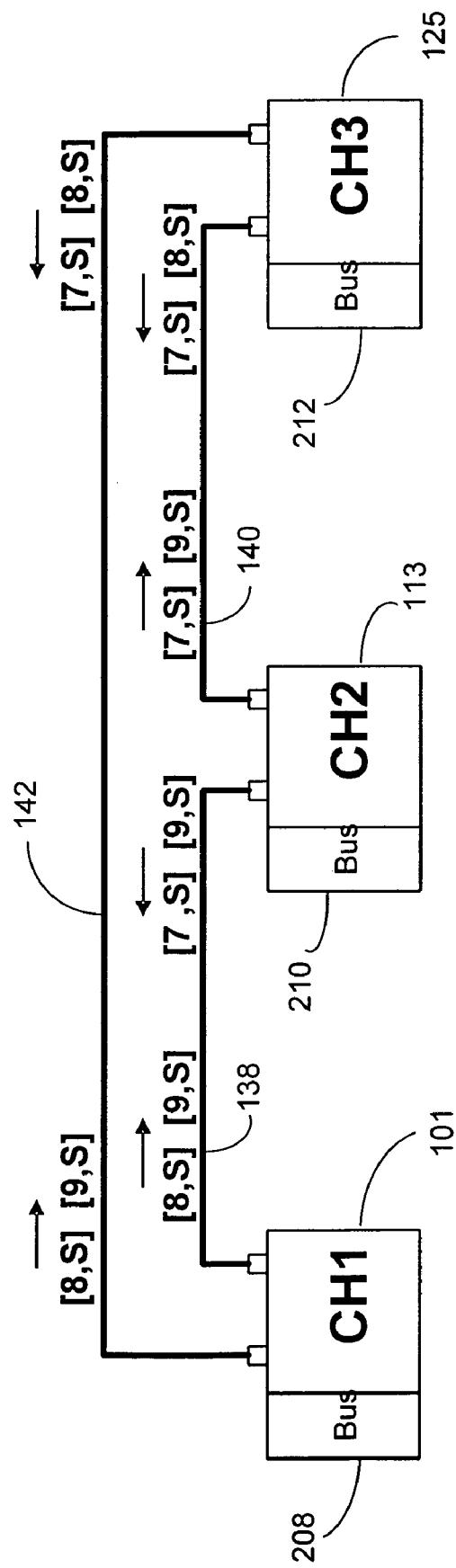

FIGS. 2A-C are schematic diagrams depicting a process for exchanging input values in a redundant fault tolerant computer system in accordance with one embodiment. The illustration is based on system 100 of FIG. 1. The process may be carried out, for example, by a RM Data Exchange input process incorporated into the kernel of the RTOS.

The process of determining input values generally includes four steps. The first step, depicted in FIG. 2A includes the receipt by computer channels CH1 101, CH2 113, and CH3 125 of raw data, for example from sensors 202, 204, and 206, respectively. The sensors 202, 204, and 206 communicate data to their respective computer channels CH1 101, CH2 113, and CH3 125 via associated system buses 208, 210, and 212. In the example of FIG. 2A, sensor 202 outputs a value of 7, sensor 204 outputs a value of 8, and sensor 206 outputs a value of 9.

The sensor values obtained by the computer channels 101, 113, and 125 are then shared with the other channels 101, 113, and 125 via a two-round exchange, depicted in FIGS. 2B and 2C. The two-round exchange assures proper data exchange, or at least the detection of a fault in transmitting data. In each round of the exchange, the computer channels append signatures to transmissions to detect transmission faults. The signatures in one embodiment include a 32-bit CRC (cyclic redundancy check) of the transmitted data along with Ethernet frame CRC values.

FIG. 2B depicts the first round of input value data exchange, according to an illustrative embodiment. In the first round, sensor data is exchanged between the computer channels 101, 113, and 125 simultaneously. The timing of the exchange, along with determinations as to which channels participate in the exchange, is governed by system configuration files maintained by each computer channel CH1 101, CH2 113, and CH3 125. In the depicted example exchange, the first computer channel CH1 101 transmits a message including the sensor value 7, along with a corresponding signature S, to computer channels CH2 113 and CH3 125. The computer channel CH2 113 transmits a message including its sensor value 8, along with a corresponding signature S, to computer channels CH1 101 and CH3 125. The computer channel CH3 125 transmits a message including its sensor value 9, along with a corresponding signature S, to computer channels CH1 101 and CH2 113. Any comparison of received data to received signatures may be delayed until after the second round of the data exchange.

FIG. 2C depicts the second round of data exchange between computer channels CH1 101, CH2 113, and CH3 125. In this exchange, each computer channel CH1 101, CH2 113, and CH3 125 transmits to the remaining computer channels the data and signatures it received during the first round (FIG. 2B). The computer channels CH1 101, CH2 113, and CH3 125 do not create new signatures for the data they transmit. Thus, if there is a mismatch between the transmitted data and signature, the originating computer channel can be alerted to the transmission fault between the channels.

Accordingly, in the data exchange depicted in FIG. 2C, the first computer channel CH1 101 transmits to computer channels CH2 113 and CH3 125 the sensor values and signatures received from computer channels CH2 113 and CH3 125 in the first round, i.e., [8,S] and [9,S] respectively. Computer channel CH2 113 transmits to computer channels CH1 101 and CH3 125 the sensor values and signatures received from computer channels CH1 101 and CH3 125 in the first round, i.e., [7,S] and [9,S] respectively. Computer channel CH3 125 transmits to computer channels CH1 101 and CH2 113 the sensor values and signatures received from channels CH1 101 and CH2 113 in the first round, i.e., [7,S] and [8,S] respectively.

In the fourth step, the computer channels CH1 101, CH2 113, and CH3 125 compare the data they received during the two exchanges to obtain an input value or to issue a fault. A primary goal of the two round exchange is to ensure that each computer channel derives the same input values to use in further processing. This goal, in one embodiment, supersedes the goal of each computer channel obtaining accurate data. To this end, in one implementation, the channels disregard the original sensor data received over the respective buses in making their evaluations and instead rely on the echoes of data received back from the other computer channels.

In the three computer channel implementation as depicted, in evaluating the received data, a given computer channel CH1 101, CH2 113, or CH3 125 may determine that the signatures of one or both messages fail to match the respective message values and/or that the values for a given sensor received from the remaining computer channels do not match.

The following examples describe the potential evaluation results of various exchanges. In each example, a given computer channel receives a first message including a first sensor value and a first associated signature and a second message including a second sensor value and second associated signature.

EXAMPLE 1

Fault Free Transmission

In this example, for both messages, the received signatures are determined to correspond to the associated values included in the respective messages, and the values are equal. The channel accepts the received values as the correct sensor value.

EXAMPLE 2

Single Signature Mismatch

In this example, the signature of the first message fails to match the associated first sensor value, and the second signature in the second message correctly corresponds to its associated second sensor value. In this case, the computer channel accepts the second sensor value as the correct value and disregards the first sensor value.

EXAMPLE 3

Double Signature Mismatch

In this example, neither the first signature nor second signature correctly corresponds to their respective sensor values. In this case, the computer channel issues a fault.

EXAMPLE 4

Correct Signatures, but Non-Matching Sensor Values

In this example, both the first signature and the second signature correctly correspond to their respective sensor values, but the sensor values do not match. In this case, the computer channel issues a fault.

In system implementations with more than three computer channels, message exchanges that would otherwise result in faults may be resolved by employing a voting process. Any type of suitable voting algorithm can be used, including majority voting and bit for bit majority voting. Alternatively, in systems with more than three computer channels, voting algorithms can take the place of signatures completely.

Figure 3A:
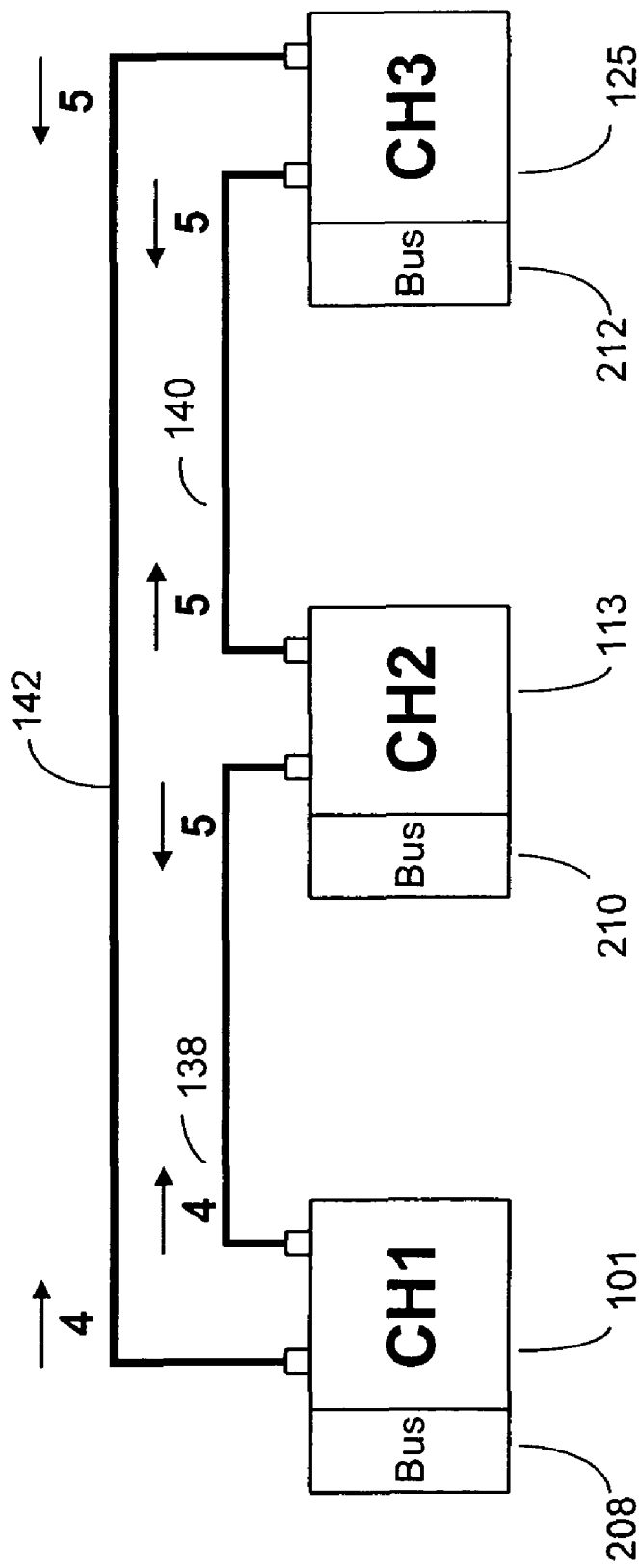
FIGS. 3A-3C are schematic diagrams of a process for detecting command output faults in a redundant fault tolerant computer system in accordance with one embodiment of the invention.
Figure 3B:
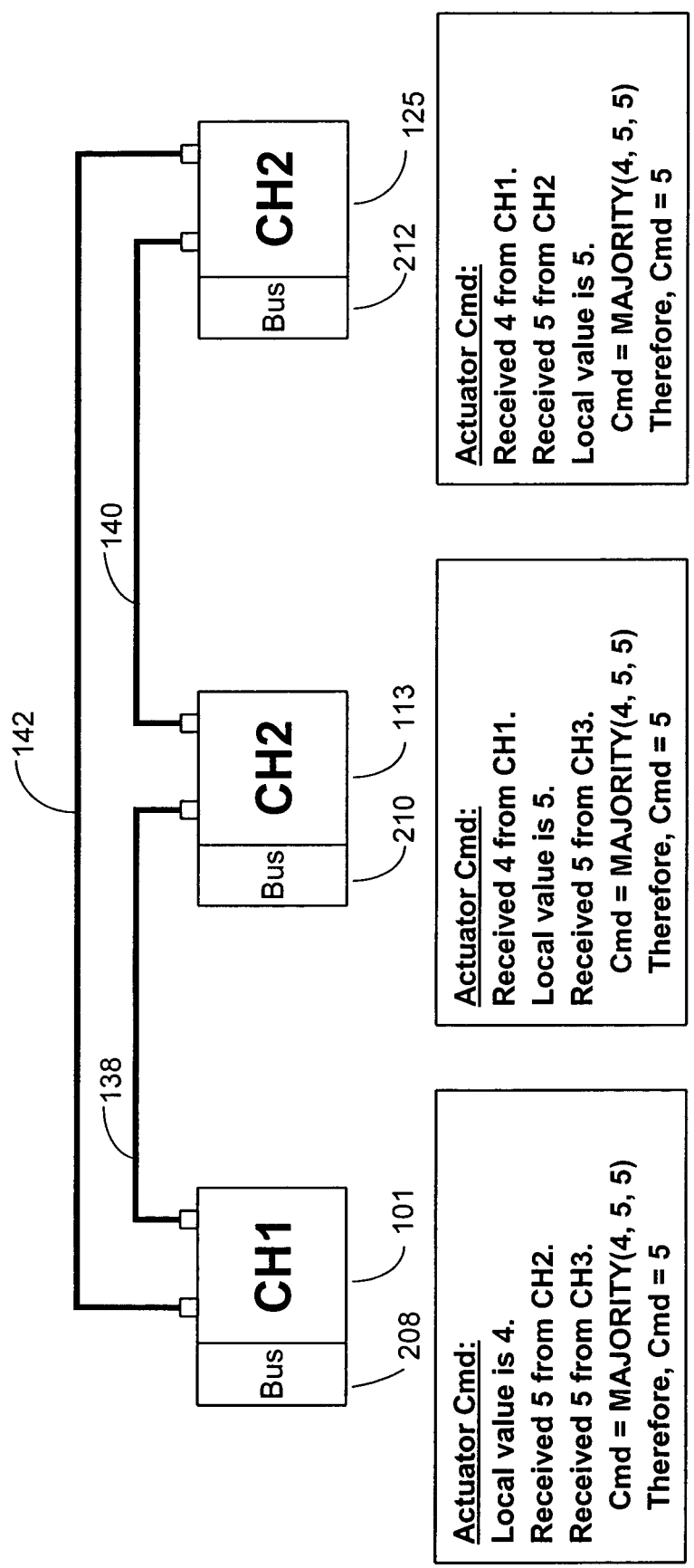
Figure 3C:
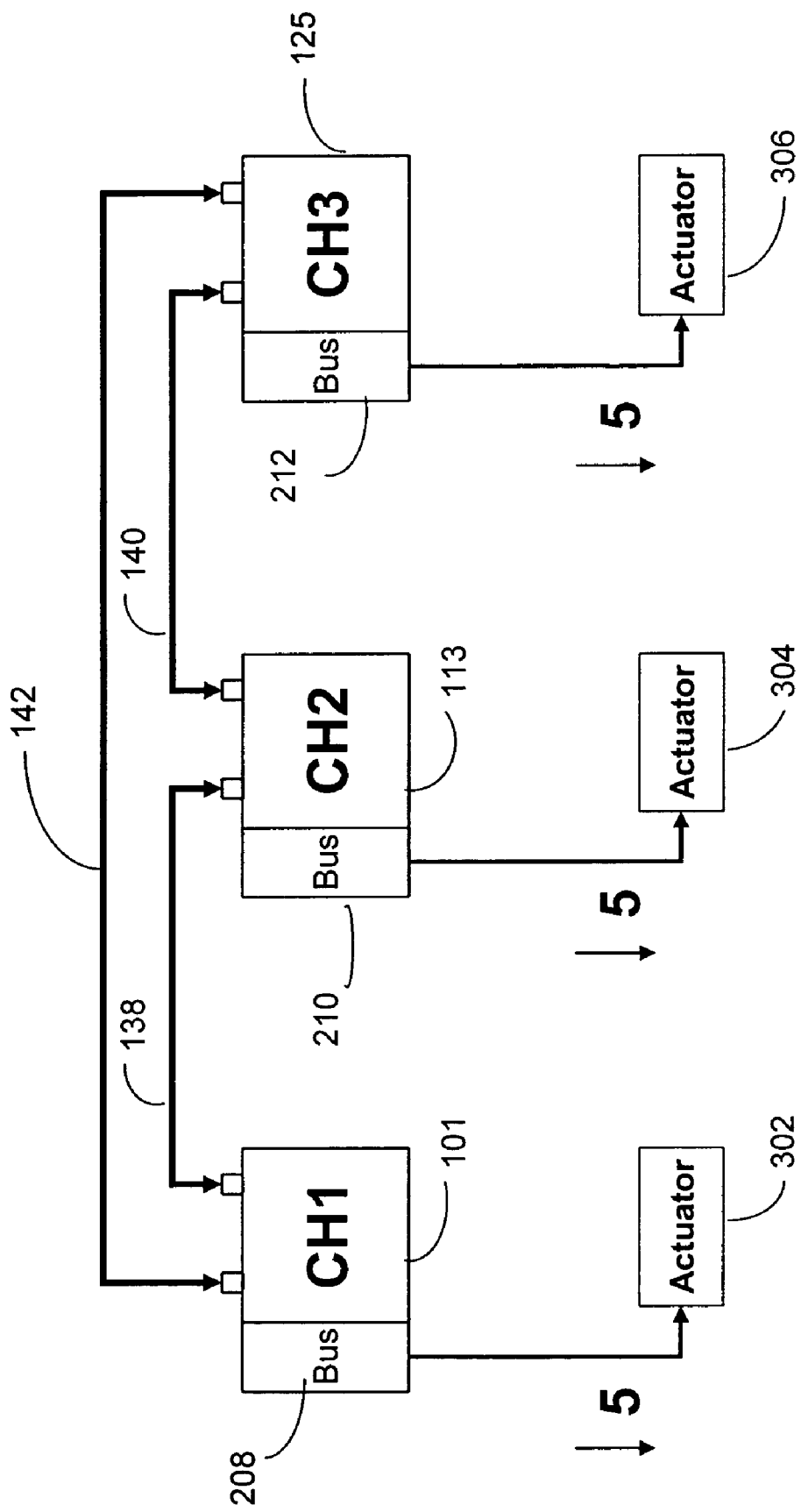

FIGS. 3A-C are illustrative schematic diagrams 300 of a data exchange process for detecting faults in-command outputs. The process can be executed by an RM Data Exchange output service executing in the kernel of a real-time operating system, in accordance with one embodiment. For example, the process may be a process for issuing actuator instructions based on the sensor data exchanged in the process described in relation to FIGS. 2A-2C. The diagrams are based on the three-computer channel system 100 of FIG. 1.

For the fault tolerant system, assuming all computer channels are able to obtain identical input values (see Examples 1 and 2 above), each computer channel should output the same results, e.g., matching actuator commands. The process for determining an output value generally includes three steps, the calculation of a local output value, an exchange of locally calculated output values, and processing the set of output values that includes the locally calculated output value and the received output values.

FIG. 3A illustrates the single-round exchange used to share locally calculated output values. For illustrative purposes, in FIG. 3A, computer channel CH1 101 experiences a Single Event Upset, and therefore produces an incorrect output value (i.e., 4 instead of 5). Then, an RM Data Exchange output service executing in the kernel of the RTOS on each computer channel transmits the locally calculated output to the other two channels via communications paths (described in connection with FIG. 1). Output ports used by the RM Data Exchange service can be configured using a soft coded configuration table (discussed in connection with FIGS. 4-5).

As depicted in FIG. 3B, at the end of this exchange, each computer channel has its own output data and the data it received from the other two computer channels. For example, computer channel CH2 113 has its own output data (5) and received output data from computer channel CH1 101 (4) and computer channel CH3 125 (5) and therefore has (4, 5, 5) as its set of data.

The RM Data Exchange output service on each computer channel passes the set of data to a RM voting service executing in the kernel of the RTOS to determine if there were any output faults. It is during the voting that the output fault from computer channel CH1 101 is detected and removed. Any type of suitable voting algorithm can be used. For example, using bit-for-bit majority voting, CH2 sees one 4 and two 5s, and determines that the 4 is a fault and 5 is the correct value. As depicted in FIG. 3C, after voting, each computer channel passes on the correct value (5) as the result via its respective bus.

Figure 4:
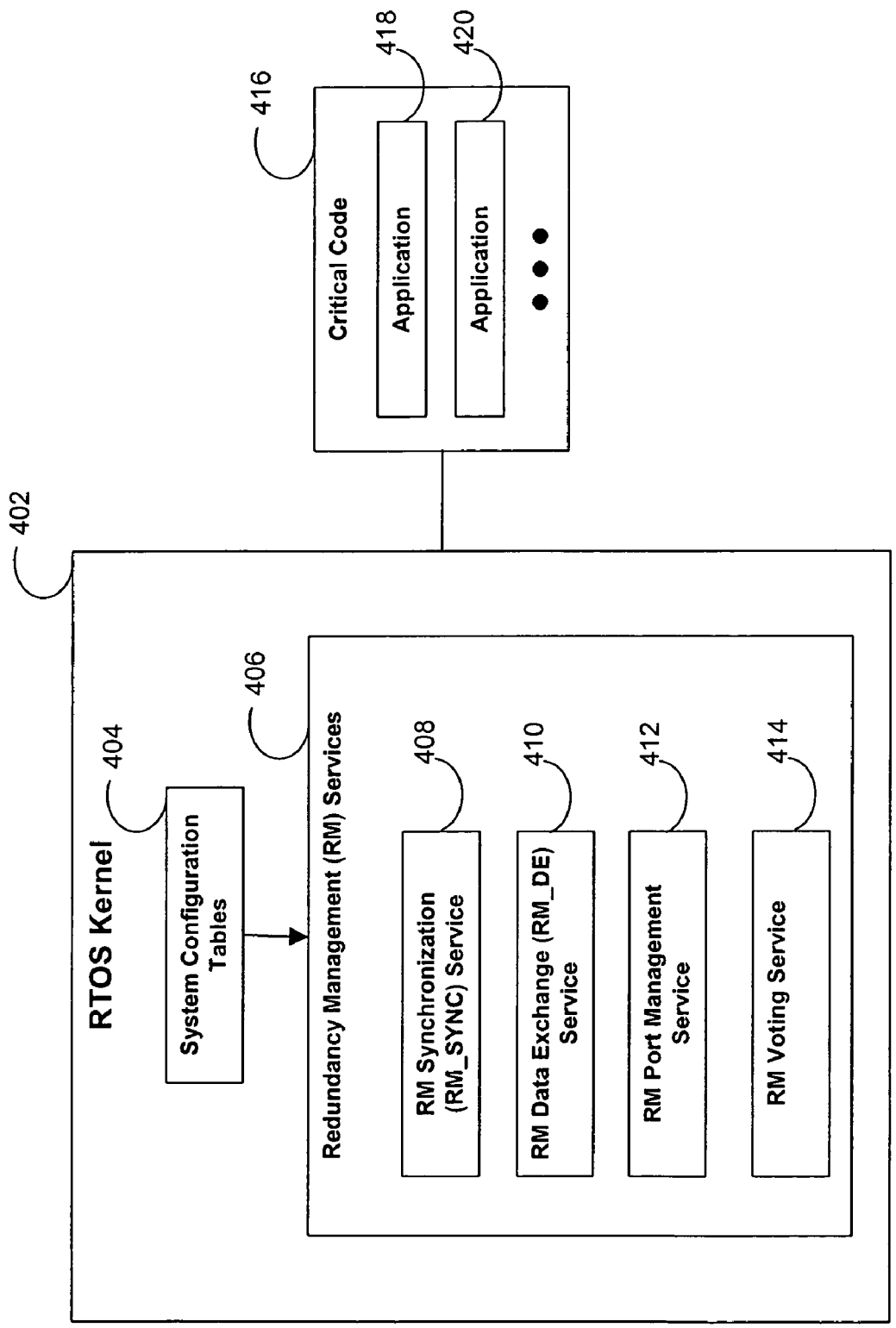
FIG. 4 is a schematic diagram of portions of a redundancy management (RM) component in a real-time operating system in a redundant fault tolerant computer system in accordance with one embodiment of the invention.

FIG. 4 shows illustrative schematic diagram 400 showing RM services running in the kernel of a real-time operating system in accordance with one embodiment. The illustration is based on one of the redundant computer channels (e.g., CH1) of FIG. 1. In particular, RTOS kernel 402 can be the kernel of any suitable real-time operating system, for example, a commercial off-the-shelf real-time operating system, such as VxWorks 653.

The RM services 406 can be user defined code that performs fault tolerance and RM functions and executes in the RTOS kernel 402. The RM services 406 can include a RM synchronization (RM_SYNC) service 408, a RM data exchange service 410, a RM port management service 412 and a RM voting service 414.

RM_SYNC service 408 can be used for synchronizing identical operations executing on each of the general purpose processors on computer channels CH1 101, CH2 113, and CH3 125 (FIG. 1). RM_Date Exchange service 410 can be used for managing communications between each of the general purpose processors on CH1, CH2, and CH3 via communication paths 138, 140, and 142 (FIG. 1). In an RTOS such as VxWorks 653, each software application can be contained in a partition, which is guaranteed a certain amount of processor time and a certain amount of protected memory. Partition communication can be accomplished using ports. RM port management service 412 can be used for managing communications between partitions executing in the RTOS. RM voting service 414 (e.g., described above in connection with FIGS. 2, 3) can be used for identifying faults in a redundant fault tolerant computing system, such as system 100 (FIG. 1).

Soft coded configuration tables 404 can be used for scheduling operations and assigning fault tolerance parameters across each of the general purpose processors on computer channels CH1 101, CH2 113, and CH3 125 (FIG. 1) (e.g., supplying fault tolerance parameters to RM services 406). For example, soft coded configuration tables 404 can include, without limitation, an identification of the number of computer channels in the system, port assignments for communication among partitions and among the other computer channels, a partition schedule including an order of application partitions as well as lengths of time associated with each partition, identification of voting algorithms, etc. Partition scheduling can be done, for example, by specifying the function of the application in a partition and its duration of execution in soft coded configuration tables 404.

RM_SYNC service 408 can align the execution of partitions in an RTOS on each of the general purpose processors. The smallest duration of execution for a partition can be one kernel tick. Kernel ticks can be generated by the decrementer register of a general purpose processor (discussed below in connection with FIG. 6). Soft coded configuration tables 404 can be based on any suitable language, such as XML. By editing soft coded configuration tables 404, a user can easily control, for example, the fault tolerance configuration, without changing any application code. An example of soft coded configuration tables 404 is discussed below in connection with FIG. 5.

Critical code 416 can be application code (application 418, application 420, etc.) that uses the services provided by RM services 406. For example, application 418 can be a guidance, navigation, and control application used in a space shuttle. Each of CH1, CH2 and CH3 (FIG. 1) can have its own GPS sensor, and application 418 on CH1 can require inputs from GPS sensors on all three computer channels to help it determine the shuttle's location. The GPS inputs can be configured as input ports to be used with RM services assigning corresponding ports to the computer channels in the soft coded configuration tables 404 (see FIG. 5 for an example table). Application 418 on CH1 can read the GPS sensor on CH1 and obtain GPS sensor data from CH2 and CH3 (e.g., through the two round exchange discussed above in connection with FIG. 2). RM Data Exchange service 410 can manage the transmit of GPS sensor data between CH1 and the other two channels via communications paths 138 and 142 (FIG. 1). RM port management service 412 can place the data to be sent and retrieve the data received using application partition communication ports. For systems including four or more computer channels RM voting service 414 can vote on the GPS data from the channels to determine the correct set of GPS values sensed by the computer channels. RM_NSYNC service 408 can synchronize the aforementioned identical operations executing on CH1, CH2 and CH3 (FIG. 1) (see discussion below in connection with FIGS. 6-7 for an example of synchronization).

FIG. 5 shows an illustrative portion of a soft coded table showing configuration of RM parameters. The illustration is based on system 100 of FIG. 1 (three redundant computer channels). In particular, lines 1 to 23 of table 500 show an XML-based configuration file for input and output groups on CH1, CH2 and CH3 used by RM services (e.g., as discussed above in connection with FIGS. 2-4). The table can be easily modified for systems with any number of redundant computer channels (e.g., by adding entries for input and output groups on additional channels).

In the example of FIG. 5, line 3 defines the name of the input port group as "various_inputs." Line 4, for example, defines a two round exchange for input values between the channels (e.g., as discussed above in connection with FIG. 2). Line 6, for example, names a particular type of input on CH1 "input_type_1_CH1" and defines the source channel for the input as CH1. XML parsers for parsing the configuration file and extracting the parameters from it are well-known.

Figure 6:
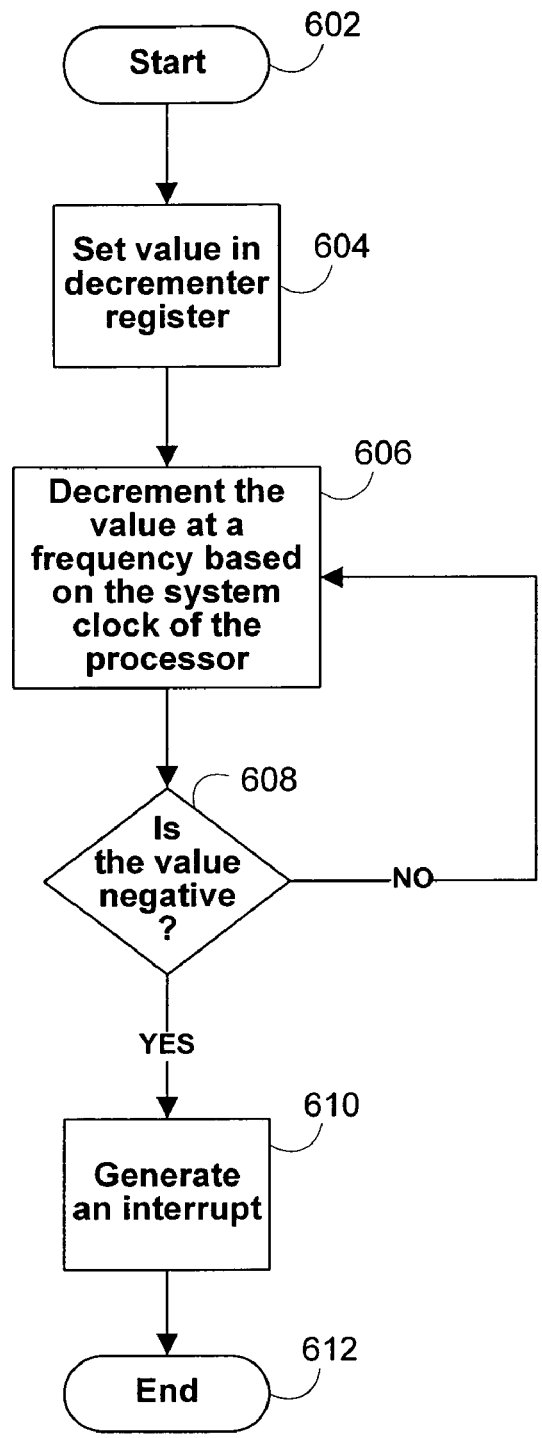
FIG. 6 shows an illustrative process flow chart of steps that can be involved in decrementing the value in the decrementer register of a general purpose processor in accordance with one embodiment of the invention.

As described above, in various embodiments, the system 100 of FIG. 1 utilizes the decrementer register of a general purpose processor in the process of synchronizing channels and managing its partition schedule. FIG. 6 shows an illustrative process flow chart 600 of a method of controlling timing boundaries by using a decrementer register. The illustration is based on system 100 of FIG. 1. For example, the PowerPC decrementer register (DEC) provides hardware interrupts (kernel ticks) which allow an RTOS to keep track of the passage of time. This register is a supervisor level (i.e., only available to code executing in the RTOS kernel), 32 bit register. For clock synchronization across all the channels to be fault tolerant, a single clock source is not used. Instead, all the channels communicate with each other to agree on the current time so they can all synchronize their RM services to execute based on a global time, even in the presence of faults. This synchronization involves the DEC as illustrated below in connection with FIGS. 6 and 7.

Step 602 of FIG. 6 indicates start of process flow chart 600. In step 604, RM_SYNC service 408 (FIG. 4) executing on the PowerPC can set the value of the DEC. The value to be set represents one kernel tick (which can serve as the basic time keeping unit) and can be calculated using a multiple of the PowerPC system clock frequency. As discussed above in connection with FIG. 4, partition scheduling using soft coded configuration tables can be done, for example, by specifying the function of the application in a partition and its duration of execution. The smallest duration of execution for a partition can be one kernel tick and execution durations can be multiples of the kernel tick time. Therefore, the smallest execution duration of the partitions scheduled using soft coded configuration tables can be a factor that determines the value to be set for the DEC. In step 606, the DEC starts to decrement its value at a frequency derived from the PowerPC system clock (e.g., 100 MHz or 133 MHz). The value in DEC can go down to zero and then become negative. In step 608, control circuitry 108 reads the value of the DEC to determine whether it is negative. If YES, a DEC interrupt is generated (step 610) and step 612 indicates the end of process flow chart 600. If NO, step 606 decrements the value in the DEC and the process continues.

RM_SYNC service 408 (FIG. 4) executing on the PowerPC can adjust the value in the decrementer register based on synchronization information to synchronize the timing of the identical operations across the general purpose processors on CH1, CH2 and CH3 (discussed in detail below in connection with FIGS. 7 and 9A-9B). After an interrupt, the DEC can be reloaded with the same value so that the process can be repeated and the next interrupt can occur.

Figure 7:
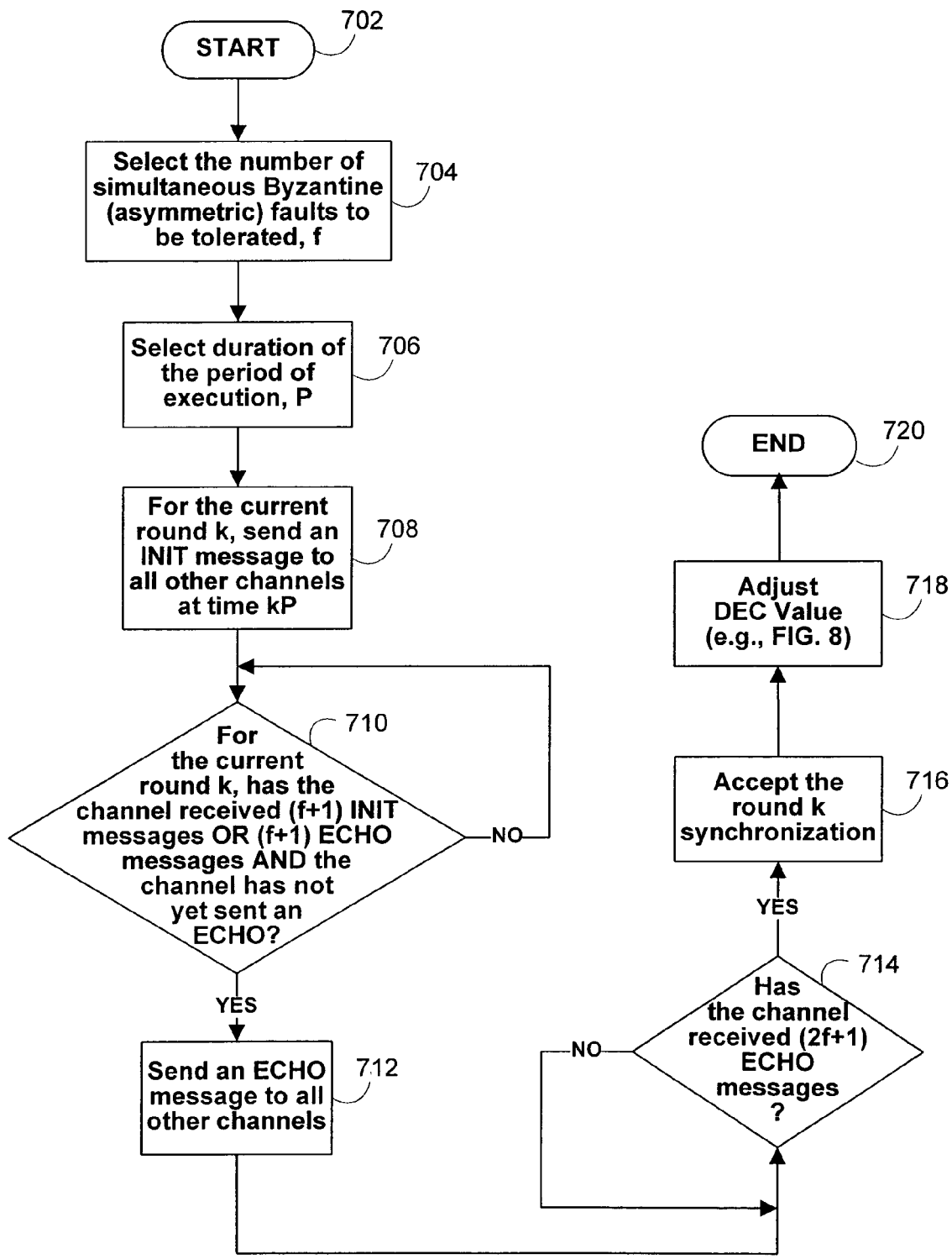
FIG. 7 shows an illustrative process flow chart of steps that can be involved in synchronizing the time across general purpose processors in accordance with one embodiment of the invention.

FIG. 7 is a flow chart 700 of a method for synchronizing time across general purpose processors in accordance with one embodiment. The illustration is based on a system similar to that of FIG. 1 that has four or more computer channels. During the process, each computer channel sends INIT messages to other channels and sends ECHO messages to other channels in response to receiving INIT messages.

Step 702 indicates the start of process flow chart 700. In step 704, RM_SYNC service 408 (FIG. 4) executing on the PowerPC can choose the number of simultaneous Byzantine faults (asymmetric, arbitrary faults) to be tolerated, f. In step 706, RM_SYNC service 408 can select the duration of the period of execution, P (e.g., each computer channel would send an INIT message exactly P seconds after the previous send of an INIT message).

In step 708, for the current round of synchronization k, RM_SYNC service 408 can send an INIT message to all other channels at time kP. In step 710, for the current round of synchronization k, RM_SYNC service 408 determines whether the channel has received (f+1) INIT messages OR (f+1) ECHO messages AND the channel has not yet sent an ECHO. If YES, in step 712, RM_SYNC service 408 sends an ECHO message to all other channels. If NO, step 710 is repeated. In step 714, RM_SYNC service 408 determines whether the channel has received (2f+1) ECHO messages. If YES, step 716 accepts the current synchronization round (round k). If NO, step 714 is repeated.

If the current synchronization round is accepted, the DEC register is updated as follows. t_del is defined as the transport delay when sending a message between two channels. It takes t_del seconds for an INIT message to travel to the other channels and it takes another t_del seconds for the ECHO messages to travel to all the other channels. For the current round of synchronization k, all channels will wait until their local clock indicates that current time ("cur_time") is exactly kP before sending the INIT (FIG. 7 step 708). Therefore, in a perfect system, the channel receives INIT messages at time (kP+t_del) and ECHO messages at time (kP+2t_del).

In a real system where the local clock on a channel drifts, a channel cannot expect to receive INIT messages at exactly (kP+t_del) or ECHO messages at exactly (kP+2t_del). Thus, each channel starts listening for messages a certain duration before time kP and each channel continues to listen for messages until some duration after kP or until (2f+1) ECHO messages are received. The duration to listen for messages is determined by several factors including the drift rate of the physical clock, the maximum difference between clocks after startup and t_del.

Clock adjustment occurs when a channel receives (2f+1) ECHO messages and accepts the synchronization round (FIG. 7 steps 716, 718). RM_SYNC service 408 (FIG. 4) executing on the PowerPC will load the DEC with a value corresponding to time(kP+2t_del).

Figure 8:
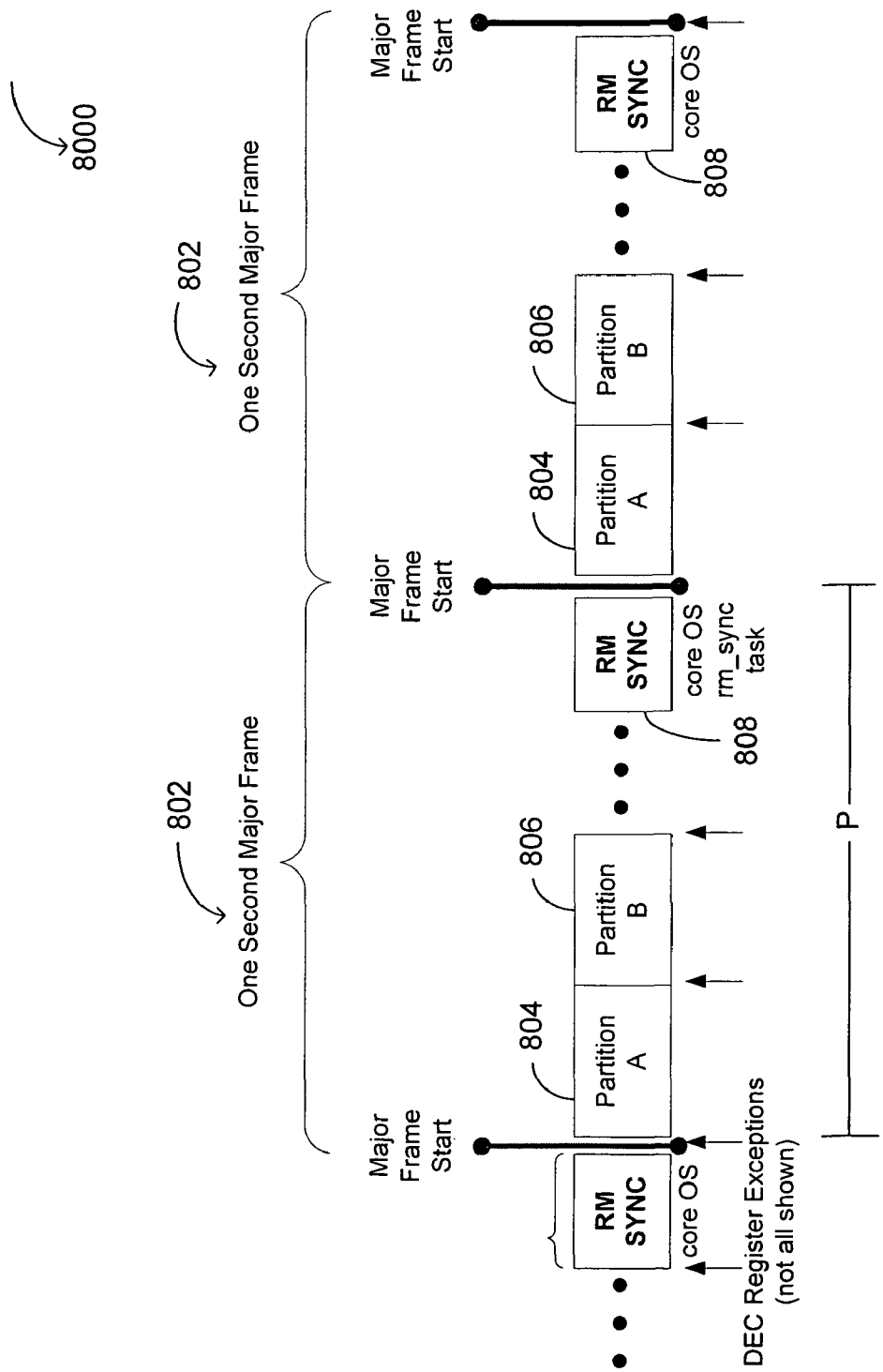
FIG. 8 is a timeline depicting features of an illustrative partition schedule suitable for use by the fault tolerant system of FIG. 1.

FIG. 8 is a timeline 800 depicting features of an illustrative partition schedule suitable for use by the fault tolerant system 100 of FIG. 1. The partition schedule divides time into periodic major frames 802. Each major frame 802 has a nominal period of P (also used as the synchronization period described above), which is preferably an integer multiple of kernel ticks, as described above. Each major frame is then divided into partitions, for example Partition A 804, Partition B 806, and RM_SYNC Partition 808. Each partition is associated with a given application or function. For example, Partition A 804 may be associated with application 418 and Partition B may be associated with application 420 of FIG. 4.

Each partition has a duration equal to an integer multiple of the kernel tick length. Upon detection of a DEC interrupt, the partition schedule is checked to determine whether it is time to switch partitions.

The RM_SYNC partition 808, which, in this embodiment ends each major frame 802, is associated with the RM_SYNC service 408. During this partition 808, once every major frame 802, the RM_SYNC service 408 in the RTOS kernel is given control over the processor to synchronize the computer channels of the system 100. The synchronization process described above in relation to FIG. 7 is one example of a synchronization process that may be carried out during the RM_SYNC partition 808 in illustrative embodiments of the invention FIGS. 10A and 10B depict features of an alternative synchronization process suitable for use by the fault tolerant system 100 of FIG. 1 during the RM_SYNC partition 808 of FIG. 8. FIG. 10A is a flow chart of the alternative synchronization process 1000. FIG. 10B is a timeline illustrating the timing of events within the synchronization partition 808 identified in FIG. 8.

In general, the synchronization process 900 includes each channel listening for synchronization messages during a limited duration window (window 950 of FIG. 9B) during the RM_SYNC partition 808. Each channel waits until it has received a configurable number, f+1, of SYNC messages from itself and other channels before accepting a synchronization and adjusting its decrementer register to more closely align with the other channels. As in the method described above, f corresponds to a number of Byzantine faults that may be tolerated by the system. A value for f may be stored in the soft coded configuration table 404. For a three computer channel system, like fault tolerant system 100, a suitable value for f is 1. Thus, each computer channel waits until it receives two sync messages (one of which may have originated from that channel as described below) before acceptance. Each computer channel compares its actual time of acceptance with an expected time of acceptance and adjusts the value stored in its decrementer register accordingly. For example, if a computer channel accepts synchronization later than expected, it will increase the value in its decrementer, thereby leading to a decrementer exception being generated, and thus the next partition beginning later than it otherwise would have, thereby bringing it closer in line to the remaining computer channels in the system.

Figure 9A:
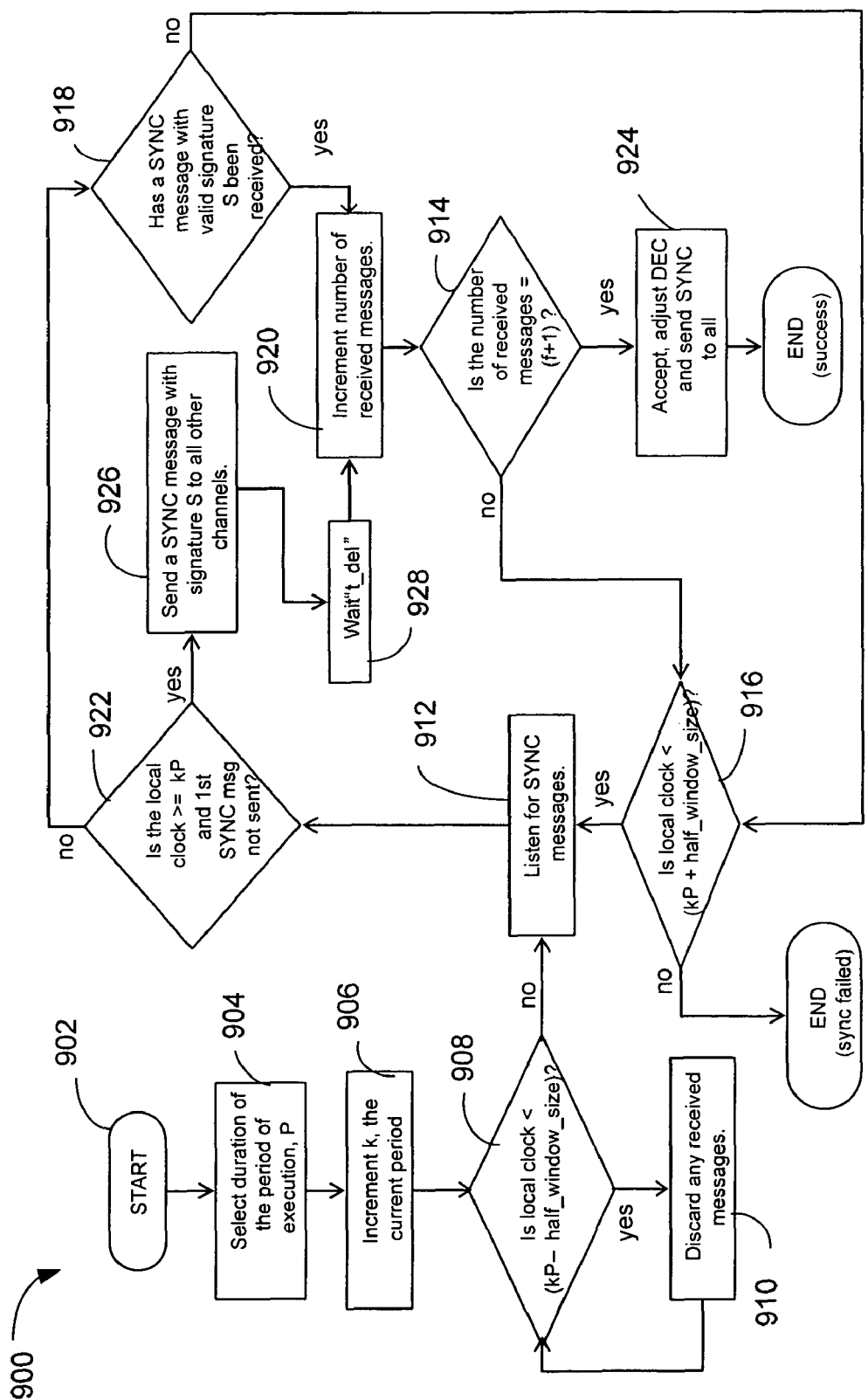
FIGS. 9A and 9B depict features of an alternative synchronization process suitable for use by the fault tolerant system of FIG. 1.
Figure 9B:
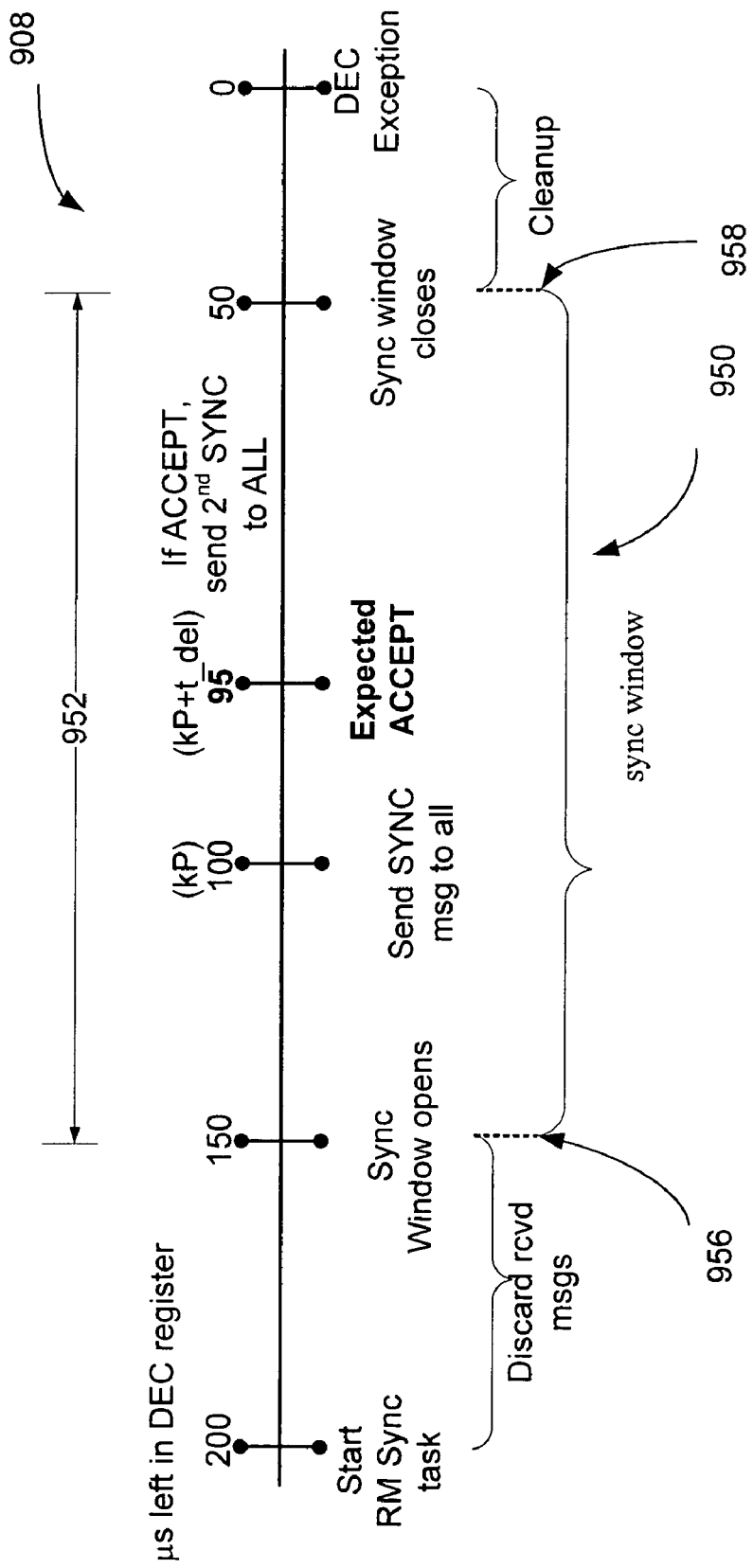

Referring to FIGS. 9A and 9B, the synchronization process begins at step 902. The first step in the method includes determining the synchronization period P, i.e., the time between synchronizations (step 904). As indicated above, in one embodiment, the synchronization period is also the length of a major frame in the partition schedule. The value P may be retrieved from the soft coded configuration table 404. At step 906, at the beginning of a major frame, k, an integer corresponding to the particular major frame is incremented. Time then passes until the window 950, beginning in RM_SYNC partition, opens.

The window 950 has a size 952 stored in the configuration table 404. In one example, a suitable window size is about 100 μsec. The window is centered around time kP. Thus, the opening of the window 956 is detected at step 908 by determining whether the value of the local clock is less than kP minus half the window size. If the local clock value is less than kP minus half the window size, i.e., before the start of the window 956, the RM_SYNC service 408 discards any synchronization messages that may be received (step 910). If the local clock value is greater than or equal to kP minus half the window size, the RM_SYNC service 408 begins listening for synchronization messages (step 912). The RM_SYNC service 408 continues to listen for synchronization messages until it has received f+1 synchronization messages (decision block 914) or the window closes 958 at kP plus half the window size (decision block 916).

Within the window 950, if the RM_SYNC service 408 receives a valid, signed synchronization message from another channel (decision block 918), the RM_SYNC service 408 increments its number of received messages (step 920) and determines whether it has now received f+1 synchronization messages (decision block 914). If the RM_SYNC service 408 has not yet received f+1 synchronization messages (decision block 914), it listens for additional messages (step 912) until the local time is greater than or equal to kP plus half the window size (see decision block 916). If the RM_SYNC service has now received f+1 synch messages (decision block 914), the RM_SYNC service 408 accepts synchronization, adjusts its decrementer as described further below, and sends a synchronization message to the other channels.

At time kP, if the RM_SYNC service 408 has not yet sent a synchronization message (decision block 922), the RM_SYNC service 408 forms a synchronization message, appends a digital signature to it, and sends the message out to the other computer channels (step 926). The RM_SYNC service 408 considers the transmission of its own message as the receipt of a synchronization message, and thus increments its total of received synchronization messages (step 920) after waiting a duration of t_del (step 928).

The RM_SYNC service 408 then determines whether it has received f+1 synchronization messages (including its own message in the total) at decision block 914. If it has, the RM_SYNC service 408 accepts synchronization, adjusts its decrementer register as described below, and sends out a synchronization message (step 924).

If the RM_SYNC service 408 has not yet received f+1 synchronization messages it listens for additional messages at step 912 until the window closes at kP plus half the window size (decision block 916). If the RM_SYNC service 408 fails to receive the requisite number of synchronization messages before the window closes (decision block 916), synchronization fails.

As indicated above, at step 924, the RM_SYNC service updates the value in its decrementer register to correct for clock drift between computer channels. The adjustment is based on a comparison between the value in the decrementer register at the time of synchronization acceptance ("cur_dec") and the expected decrementer value ("expected_dec"). If all computer channels were perfectly synchronized, they would share a common kP and would simultaneously send synchronization messages at that time. The computer channels would then receive the synchronization messages after a communication delay ("t_del"). Thus, the expected value of the decrementer value upon acceptance would correspond to a time equal to kP+t_del. Thus, at the time of acceptance, the RM_SYNC service 408 on each channel will load a value corresponding to time kP+t_del in the DEC register.

In one embodiment, each computer channel utilizes a second register, a 64-bit Time Base register in conjunction with the decrementer register to address additional skew that may be introduced due to delays in a decrementer exception handler commencing operation after issuance of the decrementer interrupt.

A different partition schedule is used for starting the system. At start-up, the only partition that executes in the schedule is the kernel RM_SYNC partition. Instead of only listening for synchronization messages during a defined window, the RM_SYNC service 408 will listens throughout the partition. In addition the RM_SYNC service 408 will also periodically send its own synchronization message to all other computer channels. If the RM_SYNC service 408 receives a synchronization message, the two computer channels (i.e., the sender and receiver) will adjust their DEC register to stay in sync. The computer channels will then start a timer, e.g., for 2 seconds, for additional computer channels to join. Additional computer channels may or may not synchronize with the duplex before the end of the timer. Based on how many channels are synchronized during this period, the channels set the parameters of their respective soft coded configuration tables for use by other RM services. The synchronized computer channels then transition from the cold start schedule to the operating partition schedule described above.

The order in which the steps of the present methods are performed is purely illustrative in nature. In fact, the steps can be performed in any order or in parallel, unless otherwise indicated by the present disclosure. The various elements of the described embodiments can be exchanged/mixed, unless otherwise indicated by the present disclosure. The invention can be embodied in other specific forms without departing from the spirit or essential characteristics thereof. The foregoing embodiments are each therefore to be considered in all respects illustrative, rather than limiting of the invention. Thus, the present invention is only limited by the claims which follow.

What is claimed is:

1. A system for providing redundant fault tolerant computing, comprising:
a plurality of computing systems, wherein each computing system comprises:
communication circuitry for communication with a remainder of the plurality of computing systems; and
a general purpose processor incorporating a decrementer register, wherein the general purpose processor is configured to:
execute identical operations as the general purpose processors of the remainder of the plurality of computing systems to provide fault tolerance through redundancy;
load a value into the decrementer register based on synchronization information, including a transport delay indicative of the time it takes for messages to travel between the plurality of computing systems; and
use the decrementer register incorporated in the general purpose processor for synchronizing the executed identical operations across the plurality of computing systems.

2. The system defined in claim 1, wherein general purpose processor in each of the plurality of computing systems is further configured to:
decrement the value in the decrementer register at a frequency derived from the general purpose processor incorporating the decrementer register; and
generate an interrupt when the value in the decrementer register reaches a threshold to indicate a timing boundary for one of the identical operations.

3. The system defined in claim 2, wherein general purpose processor in each of the plurality of computing systems is further configured to:
adjust the value in the decrementer register incorporated in the respective general processor based on the synchronization information to synchronize the timing of the identical operations across the plurality of computing systems.

4. The system defined in claim 2 wherein the interrupt is generated when the value in the decrementer register goes from zero to negative.

5. The system defined in claim 2, wherein:
the plurality of identical operations are associated with a plurality of applications, each application associated with a respective application partition; and
the general purpose processor in each of the plurality of computing systems uses the decrementer register incorporated in the general purpose processor for synchronizing the executed identical operations by:
in response to the interrupt generated when the value in the decrementer register reaches the threshold, determining that a timing boundary of one of the application partitions has been reached and transitioning to executing a different application associated with a subsequent application partition.

6. The system defined in claim 5, wherein determining that a timing boundary of one of the application partitions has been reached comprises determining whether a specified number of interrupts generated based on the decrementer register reaching the threshold, the specified number being greater than 1, has been received.

7. The system defined in claim 1, wherein the value loaded into the decrementer register is based at least in part on a soft coded configuration table.

8. The system defined in claim 1, wherein the general purpose processor in each of the plurality of computing systems uses the decrementer register incorporated in the general purpose processor for synchronizing the executed identical operations by:
   detecting at least one synchronization message from a majority of the computing systems;
   transmitting a synchronization message to a remainder of the plurality of computing systems in response to the detection of at least one synchronization message;
   determining a time corresponding to the detection of at least one synchronization message from the majority of the computing systems; and
   updating the value loaded into the decrementer register based on the determined time.

9. The system defined in claim 1, wherein the general purpose processor associated with at least one of the computing systems executes at least one operation that is not executed on the general purpose processor of at least one of the remainder of the plurality of computing systems.

10. A system for providing redundant fault tolerant computing, comprising:
    a plurality of computing systems, wherein each computing system comprises:
       communication circuitry for communication with a remainder of the plurality of computing systems; and
       a general purpose processor that is configured to:
          execute a real time operating system that is configured to;
             isolate a plurality of memory spaces corresponding to a plurality of respective application partitions; and
             switch between execution of each of the plurality of application partitions; and
          execute, in a kernel of the real time operating system, at least one redundancy management service comprising a synchronization service for aligning the execution of each of the plurality of application partitions across the plurality of computing systems.

11. The system defined in claim 10, wherein the at least one redundancy management service comprises a data exchange service for managing communications between the plurality of computing systems.

12. The system defined in claim 11, wherein the data exchange service manages communications based on point-to-point, full duplex, Gigabit Ethernet.

13. The system defined in claim 10, wherein the at least one redundancy management service comprises:
    a port management service for managing communications between each of the plurality of application partitions executing in the real time operating system.

14. The system defined in claim 10, wherein the at least one redundancy management service comprises:
    a voting service for identifying faults in the system for providing redundant fault tolerant computing.

15. The system defined in claim 14, wherein the voting service comprises bit-for-bit majority voting of computing system outputs.

16. The system defined in claim 10, wherein the general purpose processor in each of the plurality of computing systems is configured to:
    load a value into a decrementer register incorporated into the respective general purpose processor based on a transport delay indicative of the time it takes for messages to travel between the plurality of computing systems.

17. The system defined in claim 16, wherein the real time operating system switches between execution of each of the plurality of application partitions in response to determining that a specified number of interrupts generated based on the decrementer register reaching a threshold has been received.

18. The system defined in claim 10, wherein the plurality of application partitions includes a synchronization partition that is associated with the synchronization service.

19. A system for providing redundant fault tolerant computing, comprising:
    a plurality of computing systems, wherein each computing system comprises:
       communication circuitry for communication with a remainder of the plurality of computing systems;
       a general purpose processor that is configured to:
          execute a real time operating system that is configured to:
             isolate a plurality of memory spaces corresponding to a plurality of respective application partitions; and
             switch between execution of each of the plurality of application partitions; and
          a soft coded table configured for use by the general purpose processor for scheduling operations and configuring fault tolerance parameters across the plurality of computing systems, wherein the soft coded table is used to schedule the execution of each of the plurality of application partitions across the plurality of computing systems.

20. The system defined in claim 19, wherein the soft coded table is used to configure an identifiable number of computing systems.

21. The system defined in claim 19, wherein the soft coded table is based on XML.

22. The system defined in claim 19, wherein the soft coded table is used to configure input and output parameters.

23. The system defined in claim 19, wherein the general purpose processor in each of the plurality of computing systems is configured to:
    load a value into a decrementer register incorporated in the respective general purpose processor based on a transport delay indicative of the time it takes for messages to travel between the plurality of computing systems.

24. The system defined in claim 23, wherein the real time operating system switches between execution of each of the plurality of application partitions in response to determining that a specified number of interrupts generated based on the decrementer register reaching a threshold value has been received, wherein the soft coded table stores respective specified numbers of interrupts for each of the application partitions.

25. The system defined in claim 19, wherein the plurality of application partitions includes a synchronization partition that is associated with a synchronization service used for aligning the execution of each of the plurality of application partitions across the plurality of computing systems.

26. The system defined in claim 25, wherein the soft coded table is configured to schedule execution of at least one synchronization partition within an application partition schedule.

* * * * *